(12) United States Patent
Cercone et al.

(10) Patent No.: US 6,696,174 B2
(45) Date of Patent: Feb. 24, 2004

(54) METHOD OF REPAIRING MULTIPLE TUBE STRUCTURES AND REPAIRED MULTIPLE TUBE STRUCTURES

(75) Inventors: Lawrence D. Cercone, Pasadena, CA (US); John W. Wegner, Monrovia, CA (US); Franz Worth, Placerville, CA (US); Steve R. Bazinet, El Monte, CA (US)

(73) Assignee: Air Logistics Corporation, Pasadena, CA (US)

( * ) Notice: Subject to any disclaimer, the term of this patent is extended or adjusted under 35 U.S.C. 154(b) by 132 days.

(21) Appl. No.: 10/104,436

(22) Filed: Mar. 22, 2002

(65) Prior Publication Data

US 2003/0180570 A1 Sep. 25, 2003

(51) Int. Cl.[7] .................. B32B 15/08; B32B 15/14; B21D 3/16; F16L 41/02; F16L 55/18
(52) U.S. Cl. .............. 428/626; 427/140; 29/402.1; 29/897.1; 285/15; 138/97
(58) Field of Search .............. 428/626; 427/140; 29/402.01, 897.1; 285/15; 138/97

(56) References Cited

U.S. PATENT DOCUMENTS

| | | | | |
|---|---|---|---|---|
| 3,563,276 A | * | 2/1971 | High et al. .................. 138/99 |
| 4,504,086 A | * | 3/1985 | Carrow ................... 285/133.5 |
| 5,079,056 A | * | 1/1992 | Watkins ...................... 428/36.4 |
| 5,340,160 A | * | 8/1994 | Meijers et al. ................. 285/15 |
| 5,560,395 A | * | 10/1996 | Bissonnette et al. ........... 138/98 |
| 6,217,688 B1 | * | 4/2001 | Landers ........................ 156/94 |
| 6,360,780 B1 | * | 3/2002 | Adolphs et al. ............... 138/98 |
| 6,405,671 B1 | * | 6/2002 | Worth ......................... 116/200 |
| 6,543,487 B2 | * | 4/2003 | Bazinet ........................ 138/99 |
| 6,619,886 B1 | * | 9/2003 | Harrington ................ 405/184.2 |

* cited by examiner

*Primary Examiner*—John J. Zimmerman
*Assistant Examiner*—Jason Savage
(74) *Attorney, Agent, or Firm*—Christie, Parker & Hale, LLP

(57) ABSTRACT

A method for making a repair to a repair site of a structure made from at least a first tube and a second tube which are joined together with welds. The method includes cleaning and preparing the at least first tube and second tube tubes at the repair site for bonding with composite repair materials. Next, fiber-reinforced polymer composite repair materials are applied to the repair site. These composite materials include at least one elongate, composite tendon strip which is placed on the at least a first tube and a second tube such that the composite tendon strip bridges at least the first tube and a second tube, and a composite strip which is wrapped around and overlays the tendon strip with additional composite strips. The invention also provides a metal structure reinforced with a composite material repair site according to the method.

27 Claims, 18 Drawing Sheets

METHOD OF REPAIRING MULTIPLE TUBE STRUCTURES AND REPAIRED MULTIPLE TUBE STRUCTURES

BACKGROUND OF THE INVENTION

The invention is a method of repairing multiple tube structures, more particularly an in situ method of repairing multiple tube sign supporting structures, including multiple aluminum tube sign supporting structures.

Across the United States, there are thousands of highway sign structures, with tens of thousands of weld joints. Some of which extend across as many as 10 lanes of traffic. In many of these structures, two to four elongate larger header tubes are welded together in a framework with a number of smaller cross-member tubes, which cross-member tubes are frequently attached in an angled relationship, to create many generally triangular sections. However, sign structures can take other forms of multiple tubes welded together. Since there are a great number of different shapes, angles and sizes of joint members, construction of prefabricated reinforcement clamps is not always practical. A large number of these structures are upwards of 30 and 40 years old and have been exposed to as many years of harsh conditions such as freezing winters and ice buildup, hot summers, high winds and storms and other vibration loads, and the corrosive effects of acid rain and salt laden air. One main cause for cracking of the welds is that the welds were not made properly in the first place. Sometimes, the welds have very poor penetration and were not done with the structure preheated. Also, the aluminum in the area of the welds may have been annealed during the weld process and the structure was not reheat treated to the T6 condition. There is also evidence of internal strains in some of the structures caused by improper alignment of the pieces that are welded together. There is also evidence that the entire structure is subjected to stress when they are installed, and there are cases of the entire structures being twisted and bent. Repair by welding over traffic can be difficult to accomplish. The cost to replace these structures is extremely high, and known methods to repair such sign structures in situ are expensive, time consuming, and impractical.

There accordingly remains a need for a new method for in situ repairing of tubular sign supporting structures which is cost effective, quick, and practical.

SUMMARY OF THE INVENTION

The method of the invention for making on site repairs of structures having welded together sections of elongate members, such as tubular headers (or chords) and struts and involves the following basic steps. First, pilot holes are preferably drilled slightly beyond the ends of any weld cracks in the sound region of the weld metal to relieve stress and prevent the crack propagation. If the weld is cracked all the way around or nearly all the way around, this drilling step can be skipped. Next, the structure is cleaned in the vicinity of the repair site. This can be done by using a combination of a caustic cleaner scrub followed by water rinse and then followed by an acid etch scrub and a water rinse. After this, the surfaces are mechanically roughed up (e.g. with emery cloth, a file, sandblasting, or other known methods) and then are acid-etched and rinsed once again, followed by clean towel and then air drying. Other cleaning and surface preparation steps can also be used, such as combinations of mechanical abrasion and chemical washes. Next, a filler coving (e.g. an epoxy putty) is applied to the tube joints at any acute angle areas and/or at areas with sharp joints to flatten out the tight angled areas. This flattening out is helpful in that it ensures close bonding of wrap layers to the structure (described below). After a brief curing period, a chrome conversion coatings for aluminum is used to treat the tubes. Next, the tubes and filler are rinsed and air-dried. Next, a primer, for example, a urethane resin, is applied to the tube surface and to the putty and is allowed to tack up. Following this, a fiber wrap (e.g. fiberglass) pre-impregnated with a resin (e.g. a water cured urethane resin), such as Air Logistics Corporation's Aquawrap® Type G-03 "tape" product, is water wetted and is wrapped around the smaller cross-member tubes in a helical bandage wrapping method to create a relatively smooth and flat composite layer. Depending upon the application, the header tubes can also be wrapped with helical bandage wrapping as well. Typically, it is desirable for this first wrapping material to be of a fine weave (light-weight tow), so that the maximum contact is achieved between the reinforcing fiber and the bonding surface(s). Next, saddle segments of fiberglass water cured urethane resin pre-preg are placed on the header tube and cross-member tubes in the areas of any acute angles where the header tube and cross-member tubes are joined and the wrap segments are positioned so they lay down smoothly against all surfaces including against the filler used to reduce the sharpness of the joint regions. Next, saddle segments of fiberglass water cured urethane resin pre-preg are placed on the cross-member tube and header tube in their obtuse angle regions. Following this, elongate and narrower but thicker, uni-directional fiber "tendon" pre-pregged segments are laid down on one side face (e.g. the left side face) of the smaller cross-member tube, cross under the larger header tube, and continue to wrap to the other side face (e.g. the right side face) of the smaller cross-member tube. The process is repeated with another tendon segment on the other sides of the smaller tubes. Following this, the tendon segments are secured to the smaller tubes by helical wrapping with more of the tape pre-preg. Next, two additional saddle segments of the fiberglass water cured urethane resin wraps are placed on the header tube and cross-member tubes in the areas of the acute angles and are positioned so they lay down smoothly over the previously installed wrap. Following this, additional saddle segments of the fiberglass water cured urethane resin wraps are used in their obtuse angle region. Starting at the joint crotches, the tape pre-preg is used to completely encapsulate all of the composite layup components. Next, the repair site is tightly wrapped by Air Logistics Stricture Banding™, preferably in the same wrap direction as the fiberglass water cured urethane resin wraps. When stretched, as it is being wrapped, through its elastic properties, the Stricture Banding™ tightly compresses the layup against the tubes and putty. Due to the geometry of tubular intersections, there are some spots, most particularly in the deepest crotch of the welds in the most acute angles, where the Stricture Banding™ would not normally impart enough compressive force down onto the layup. To ensure that the layup tightly seats around the weld joints in these problem areas, a load transfer "rod", most desirably a closed cell poly foam extruded shape (often called "backer rod" in the trades) can be seated around and over the problem areas. Then by overwrapping this load transfer rod with Stricture Banding™, the Stricture's load is conveyed from an area where it can be effected (the outside diameter or edge of the load transfer rod) to the area where the load is needed (the crotch of the weld, for instance). Aquawrap® products evolve a small amount of carbon dioxide gas when they cure. Because the evolution of this gas can become entrapped beneath the Stricture Banding™, the Stricture Banding™ can preferably be ventilated by poking holes in it, using the point of a sharp knife or a perforating roller, known in the trade as a "porcupine roller". This permits curing bubbles and any excess water to escape. The repair is allowed to cure for the required amount of time, e.g. 30 minutes or until hardened. The Stricture Banding™ and backer rod are unwrapped and/or removed, the composite repair site is permitted to air dry. The repair site can then be painted if desired.

DETAILED DESCRIPTION OF EMBODIMENTS OF INVENTION

Figure 1:
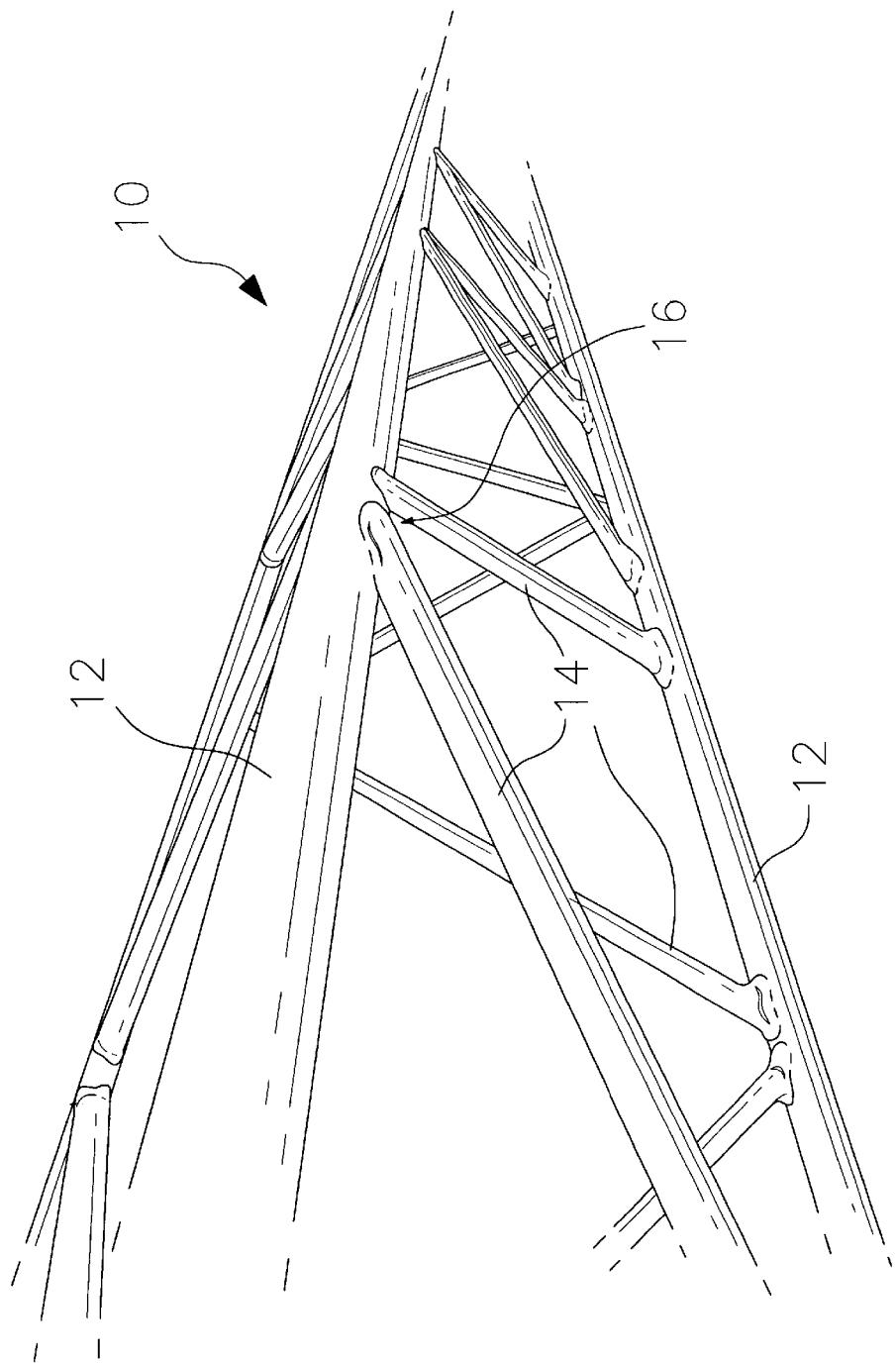
FIG. 1 is a perspective view of a rear side of a tubular sign support structure with cracked welds.

Turning first to FIG. 1, there is shown a perspective view of a rear side of a tubular sign support structure 10 with cracked welds. The tubular sign support structure 10 has header tubes 12 and cross-member tubes 14 which are welded together. The welds in region 16 are cracking. FIG. 1 shows the structure 10 as having three header tubes 12 and a plurality of cross-member tubes 14. However, the structure can have, for instance, three or four header tubes (for a box-like construction) and/or have the cross-member tubes arranged in different orientations, and other shapes. The structure can be made from material such as metal tubes, including but not limited to aluminum and galvanized steel, which are attached together by welding and other attachment methods, and which are subject to cracking or other failure modes at the joints.

Figure 2:
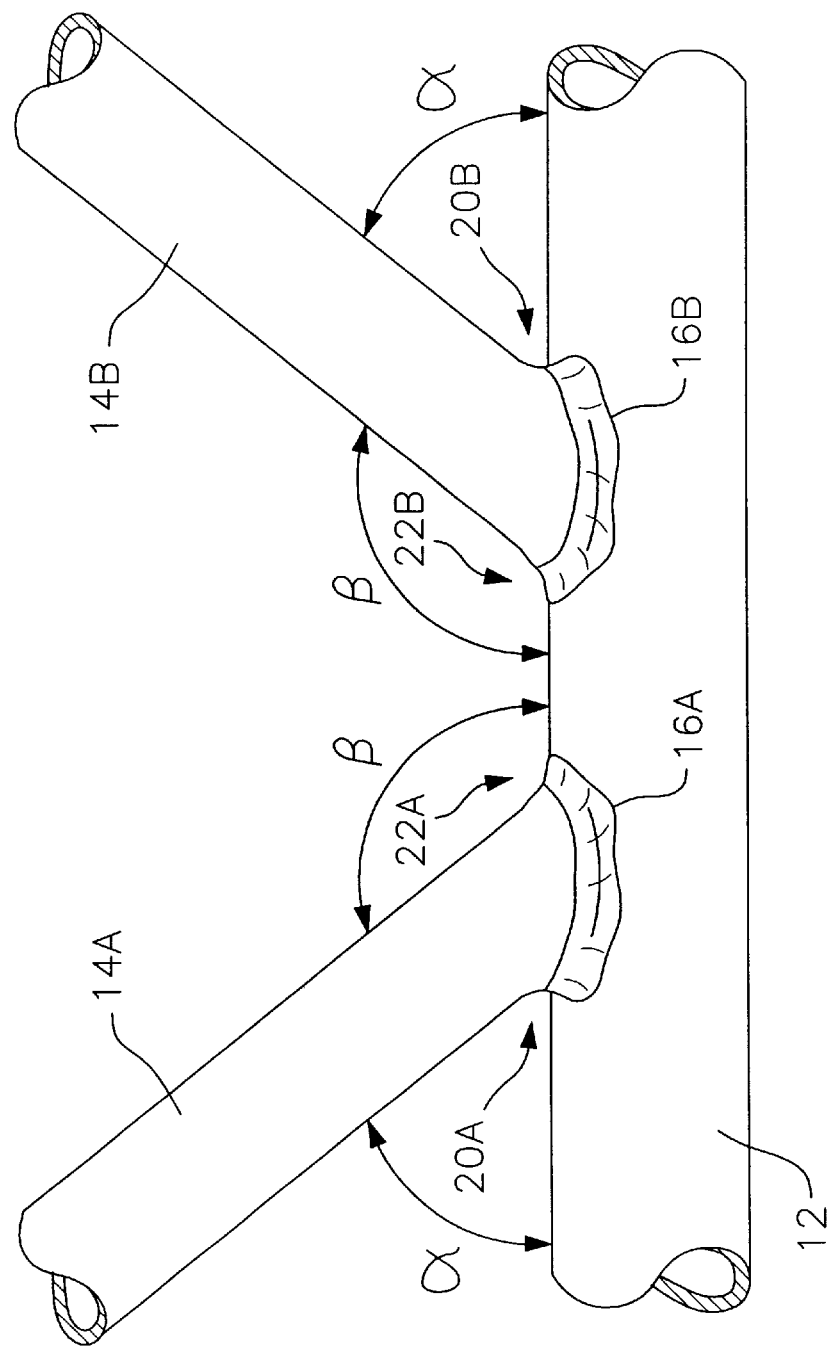
FIG. 2 is side view showing a header tube with two cross-member tubes welded thereto with cracked weld joints.

FIG. 2 is a side view showing a header tube 12 (sometimes "first tube") with two cross-member tubes 14A and 14B (sometimes "second tube" and "third tube") welded thereto along weld lines 16A and 16B. Cross-member tubes 14A and 14B are often welded to header tube 12 at acute angles $\alpha$ at their crotch regions 20A and 20B and at obtuse angles $\beta$ at their saddle regions 22A and 22B. Although header tube 12 is shown with a larger diameter than cross-member tubes 14A and 14B, the diameters can vary as required and the tubes can be of other profiles, including out of round shapes. Weld lines 16A and 16B are present in the interface of cross-member tubes 14A and 14B and header tube 12.

Figure 3:
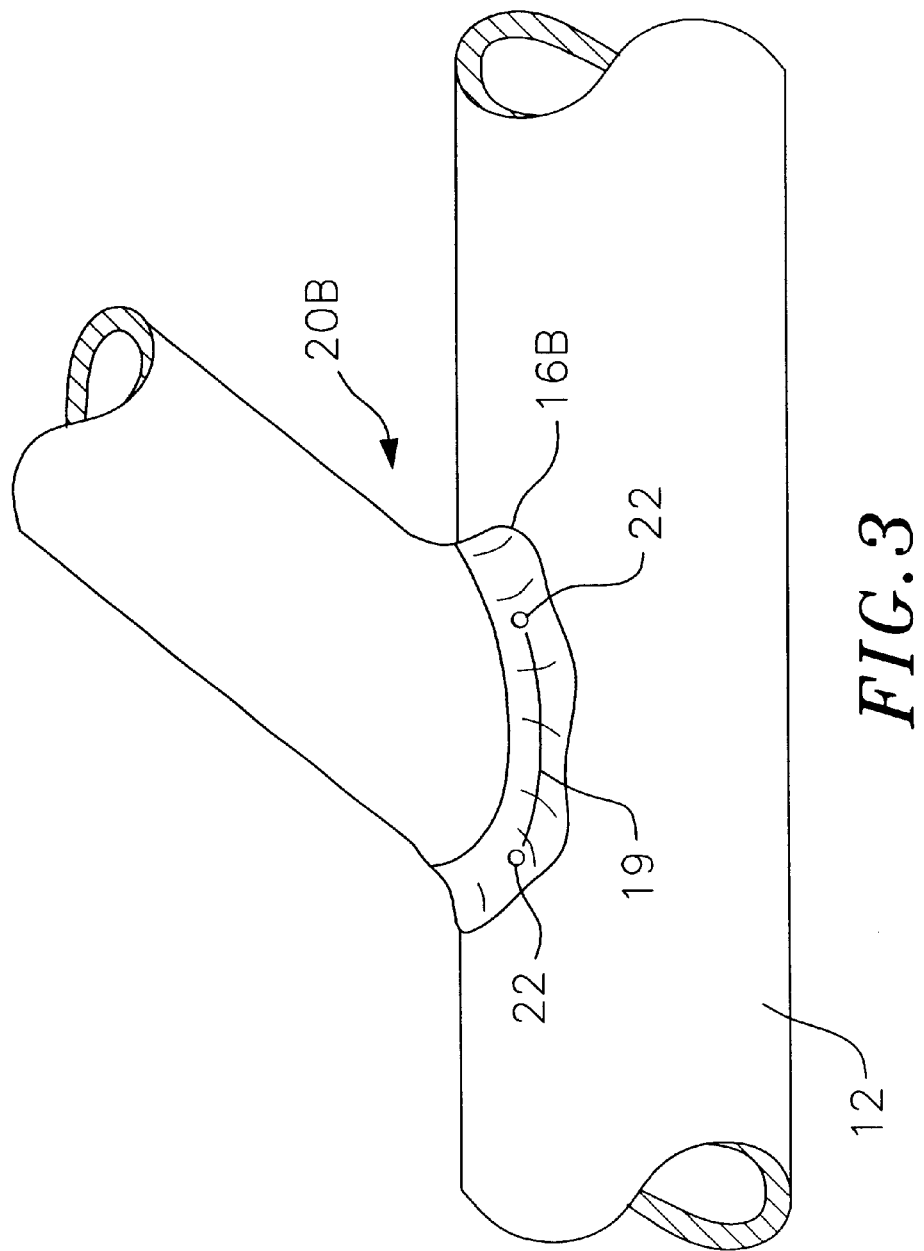
FIG. 3 is a detail of FIG. 2 showing a crack in the weld between a header tube and a cross-member tube, and drilled relief holes.

FIG. 3 is a detail of FIG. 2 showing a crack 19 in weld 16B. As part of the method of the invention, in order to help prevent crack 19 from propagating any further, a small hole 22 (e.g. 5 mm [3/16"]) may be drilled through into and preferably all the way through the weld 16B slightly in front of or at the terminus of both ends of crack line 19.

The next few steps are typical preparatory steps employed to prepare an aluminum bonding surface for properly adhering the resin impregnated strips thereto. For some applications, the "bonding area" to be cleaned may extend about 46 cm (18") out from the welds, and the area between the tubes, but this distance can vary depending on the tubing sizes used and the required strength characteristics of the subject invention.

While the following steps provide a clean and profiled surface ready for bonding with the resin segments, different methods to clean and prepare the repair site can be used, including combination of chemical and/or mechanical means. The bonding surfaces of the tubes in the vicinity of the repair site will be scrubbed with an alkali cleaner, such as Loyal 3020 (128:4 dilution with water: Loyal 3020), provided by Royal Soap, of Irwindale, Calif., using a synthetic fiber scouring pad. Other types of scrubbing devices, e.g. stainless steel wool pads, etc. can be used. This scrubbing step is continued until no more oxides appear to come up. The area cleaned is then thoroughly water-rinsed. At this point, the repair technician may change to a new pair of outer gloves. In the next preparation step, the bonding surfaces are acid etched with a strong acid cleaner. For preparing aluminum tubing, Henkel Alumiprep® 33 (2:1 dilution with water: Henkel Alumiprep® 33), provided by Henkel Surface Technologies of Madison Heights, Mich., can be used. Other acidic cleaners will also function. The bonding surfaces are scrubbed well while wet with the Alumiprep®. The recommended minimum dwell time is about three minutes with this product, although shorter times will also function depending on the condition of the repair site, concentration of the cleaner, temperature, and other factors. The bonding surfaces are rewetted with Alumiprep® if drying occurs during the dwell time. After passage of the dwell time, the surfaces are thoroughly water-rinsed. From this point forward, any touching with bare hands, dirty gloves, etc., will require a solvent wipe down of the contaminated area (e.g. with an acetone wipe) or further cleaning as described above.

Next, the bonding surfaces are scuffed up, such as with emery cloth, until all bonding surfaces have been thoroughly scratched, including and until there is no remaining oxide discoloration anywhere (except possibly in the deepest weld bead grooves and any cracks). Power sanding and wire brushing tools could likewise be used to remove corrosion and roughen up the repair site. Sanding transverse to load axis is useful and sandblasting of the repair site can be carried out, if desired. Generally, this means that the bonding surfaces are abraded so that the scratch marks go mainly around and around the tubes, as opposed to mainly along their long axis. Next, the bonding surfaces are rewetted with fresh Alumiprep® (e.g. using a clean sponge), and allowed to dwell for an appropriate time. Next, the cleaned site is thoroughly water rinsed. At this point, the technician can change to a new pair of outer gloves, and the clean site should be permitted to dry (e.g. by air, warm air flow, chemically-sterile towels, etc.). Gloves should be worn to prevent skin oil from contaminating the clean surface. The technician must check any deep weld bead grooves and cracks for trapped water. Absent adequate cleaning and drying, the resin impregnated strips may not be optimally bonded to the tubes, and the resulting repair will not be as strong as it would otherwise be.

While the foregoing steps have been described as alkali washing, acid washing, mechanical abrasion, and then additional acid washing and rinsing, the order of these steps can be varied and some cleaning steps could possibly be eliminated.

In a next step, the weld areas, in particular the acute-angle and sides weld areas, can be filled with a coving material, such as an epoxy putty. However, other filling materials can be used, or if the joints are not sharp, this step can be skipped. Use of about one 17.5 cm (7") long 5/20 epoxy putty stick (e.g. made by Air Logisitcs of Azusa, Calif.) per joint is sufficient, but other amounts can be used depending on the areas to be filled in, the size of the tubes, degrees of joint angles, amount of any flaring of cross-member tubes, etc. The epoxy coving is smoothed and the edges are feathered. The epoxy putty can be allowed to cure to about finger nail indentation hardness, which normally takes about 10 minutes at room temperature. This procedure can be done by mixing only half of the epoxy stick at a time and only addressing one joint angle at a time.

Figure 4:
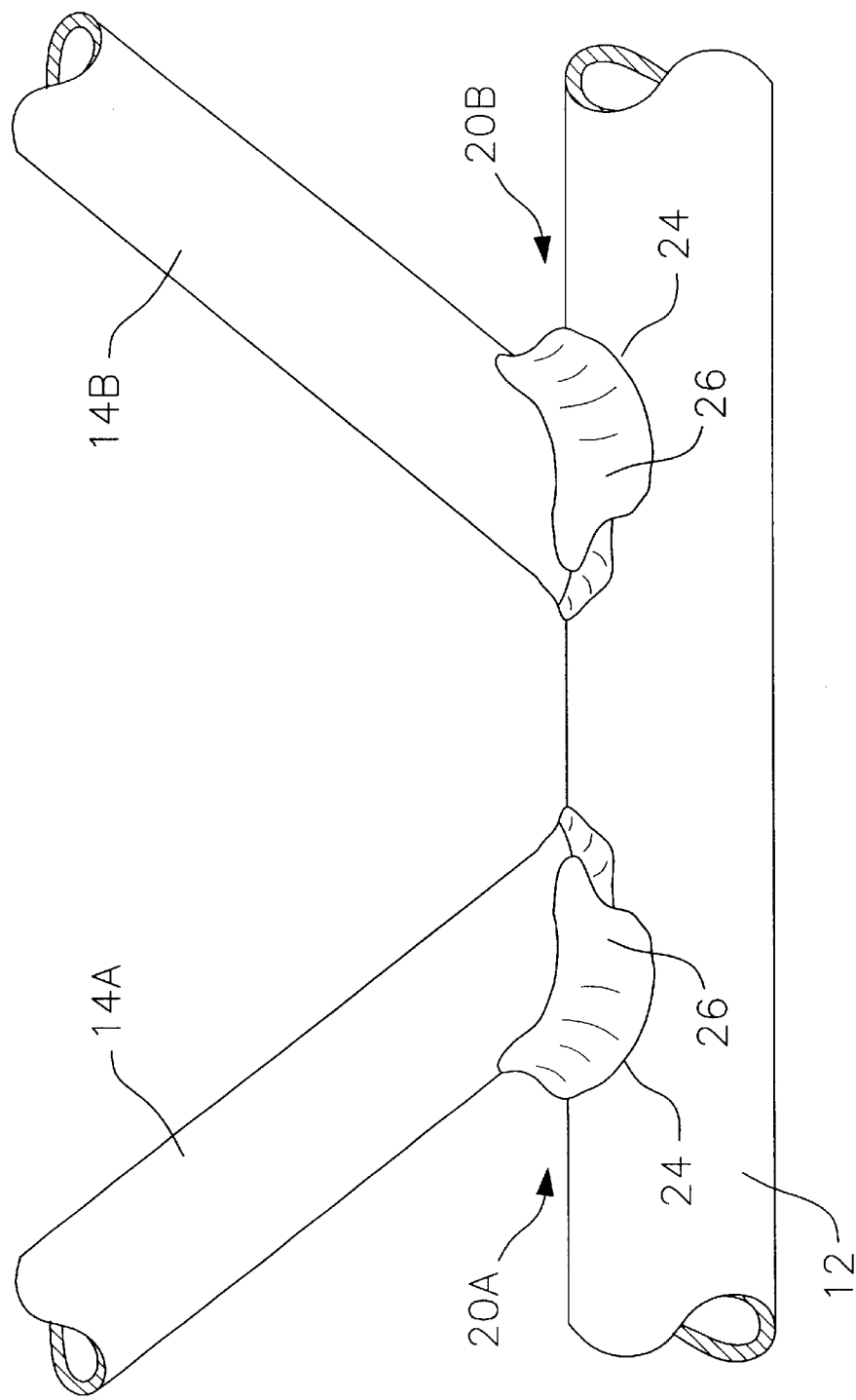
FIG. 4 is side view showing the header tube and two cross-member tube arrangement of FIG. 2, with epoxy putty applied around the welds, in particular around the acute angled crotch and sides of the welded areas.

FIG. 4 is side view showing the header tube and two cross-member tube arrangement of FIG. 2, with epoxy putty 24 applied around the welds, and in particular around the acute angled crotch 20 and lateral sides of tube welds 26.

Next, the bonding surfaces (including any coving material) are wetted out with, for example, Henkel Alodine® 1201 (full strength) or other surface preparation products using a new, clean sponge (no abrading at all.) Alodine® 1201 is a chrome conversion coatings for aluminum. The material is allowed to dwell on the surface for about two minutes with constant rewetting. The Alodine® 1201 is then thoroughly water-rinsed off of the surface. The surface is wiped down with clean (preferably) white towels until no more color runs off or lifts from the bonding surfaces. The user should check any deep weld bead grooves for trapped water. The corner of a clean towel can be used to pull excess water from these areas, or other means can be used, such as drying with a warm air blower. Again, while the above described steps have been used to prepare aluminum surfaces, it is nonetheless within the scope of the invention to use other combinations of chemicals and/or mechanical surface preparation, to prepare the repair site for bonding with composite materials.

Next, the thoroughly cleaned and roughened surface may be primed. The user will thoroughly mix a primer, such as Air Logistics' Base Primer #1 and then apply it to the bonding surfaces with hand paint brushes, spraying, or other known methods. Other primers by other manufacturers can be used as well. The user can lay down a generally thin coat with extra heaviness dabbed in around the welds/epoxy putty areas. The primer will be permitted to cure until it just begins to get tacky, which usually happens in about 3 to 20 minutes.

In the steps that follow, composite repair segments are applied to the cleaned and primed tubes. For speed and convenience, it is preferable that the composite repair segments be pre-impregnated resin segments. Although the invention is described as utilizing Air Logistic Corporation's Aquawrap® products, other composite repair segments, either supplied pre-impregnated or impregnated with resin at the site, can be used. The Aquawrap® is a factory-resin-wetted (pre-preg) fiber reinforced polymer (FRP) composite system, provided in pouches uncured. The fibers can be fiberglass, such as E-glass, but other high strength fibers can be used such as S-glass, carbon fiber, Kevlar® and hybrids, just to name a few. The resin can be Air Logistics Corporation (ALC) polyurethane or other high strength water activated resins. It is also possible to use UV activated resins. The Aquawrap® products cure on contact with water, either from air humidity or applied moisture. The Aquawrap® products will even cure under water. To use the product, the repair technician will open the pouch and wet the Aquawrap® product (e.g. by dunking it in a water tray). Initial hardening occurs in about 20 minutes to an hour, with substantial strength being provided in a couple of hours. Some advantages of using pre-impregnated water-curing resin fiber segments (e.g. fiberglass) is that they do not required application of a separate resin coating, are fast drying, will stick to the surface to which they are being applied, and are very easy and fast to work with. Again, while the Aquawrap® product functions well, other products can be used.

For convenience sake, the various required segments of the Aquawrap® product can be provided in a set of labeled packages (e.g. Package A, B, C, etc.) for different job requirement (e.g. enough material to complete a repair of a single header tube and double cross-member tube joint). Moreover, in order to make repairs easier to plan and carry out, everything needed to make a repair can be provided in a kit, including some or all of gloves, protective coveralls, goggles, absorbent mats, sprayers, brushes, dip trays, stirring sticks, emery cloth, cleaning and preparation chemicals, epoxy putty, primer, the required Aquawrap® products in pouches, etc.

The following steps are exemplary of the steps carried out to strengthen a section of header tube and two cross-member tubes affixed thereto, and is not intended to limit the application of the method to this particularly described joint structure, it being understood that the method can be used to repair a wide variety of arrangements of tubes joined together.

Figure 5:
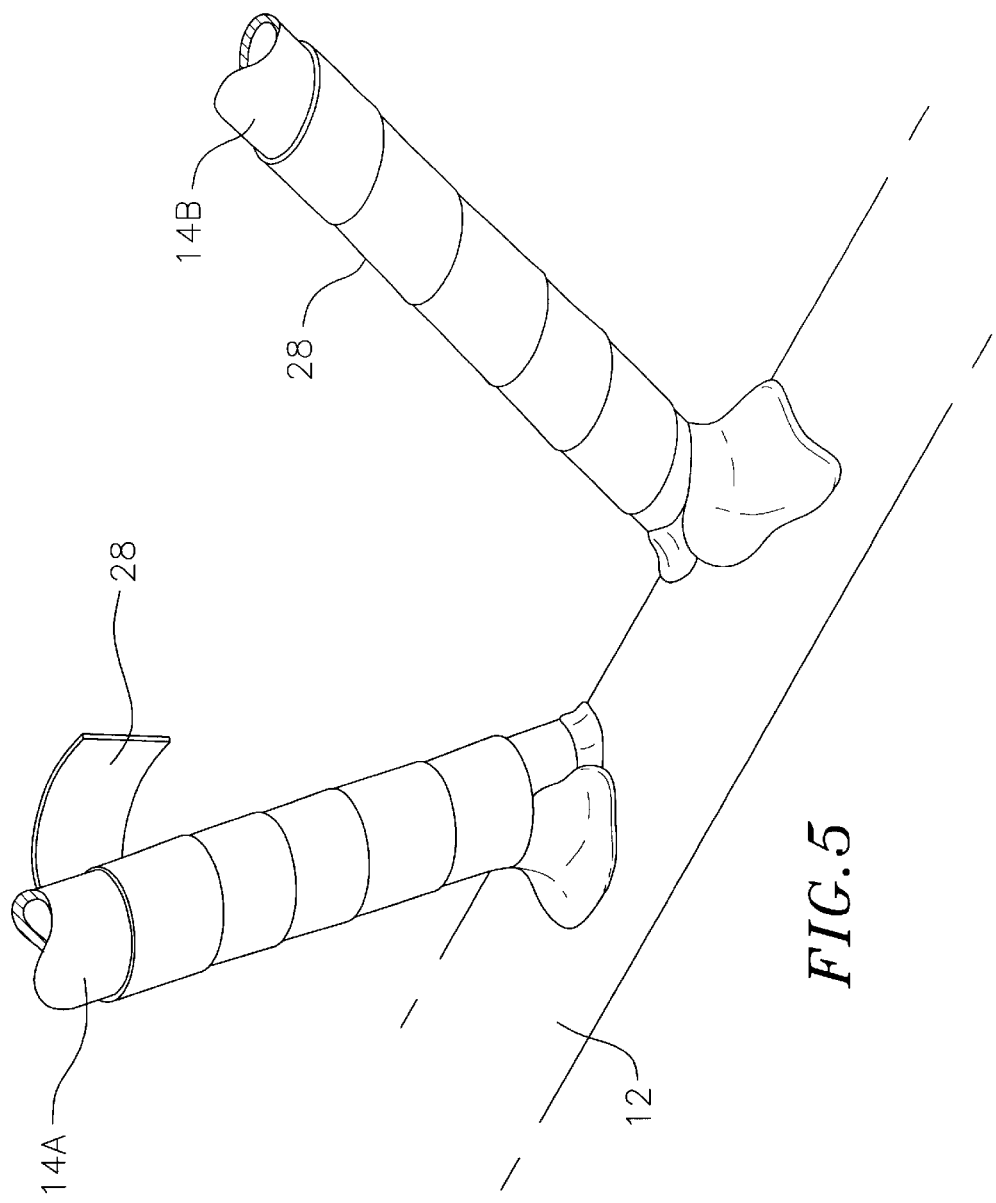
FIG. 5 is a perspective view showing the cross-member tubes wrapped with resin impregnated strips.
Figure 6:
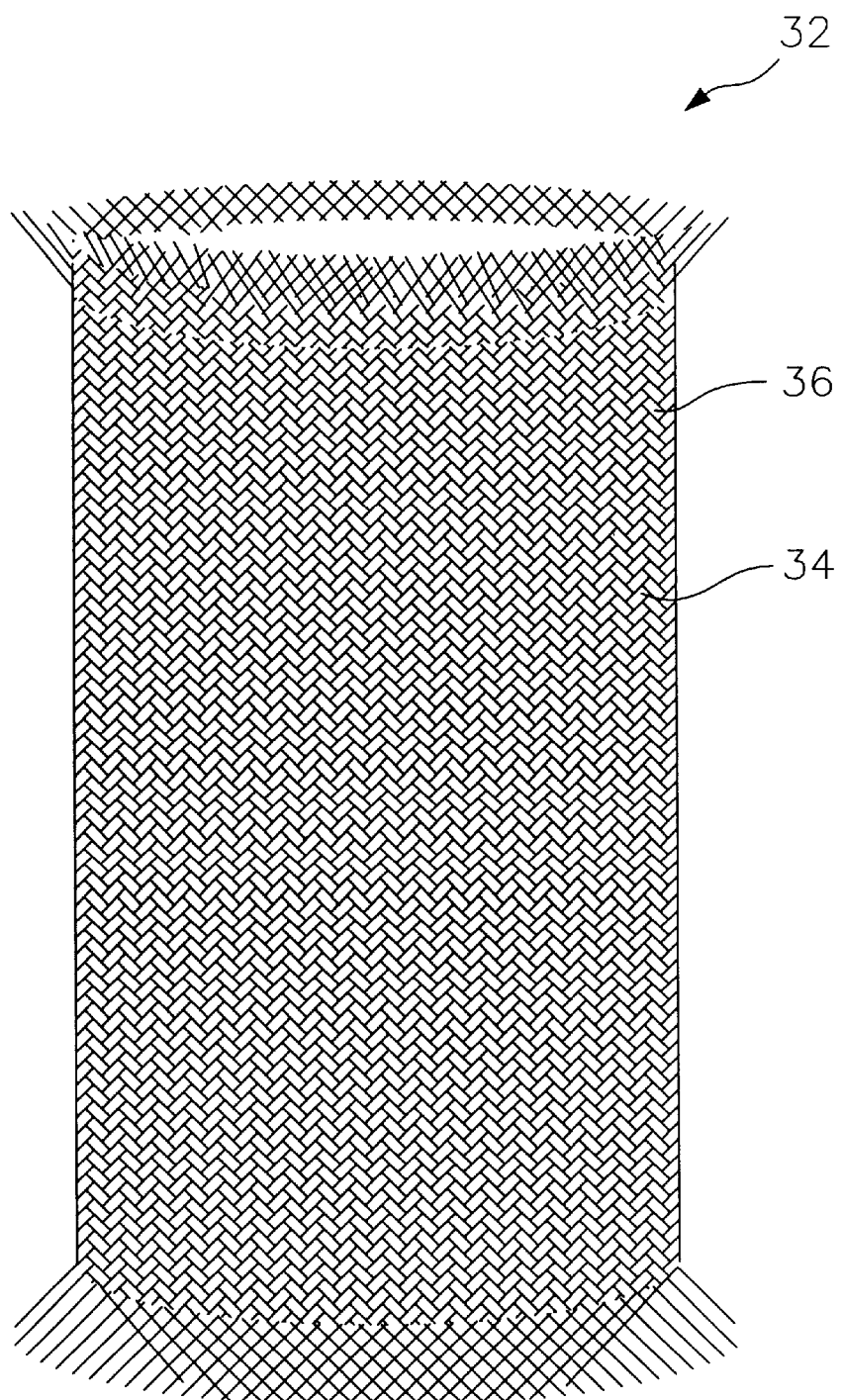
FIG. 6 is a perspective view showing a braided tubular fiber reinforcement segment structure for application to areas where the header tubes and cross-member tubes are attached.
Figure 7:
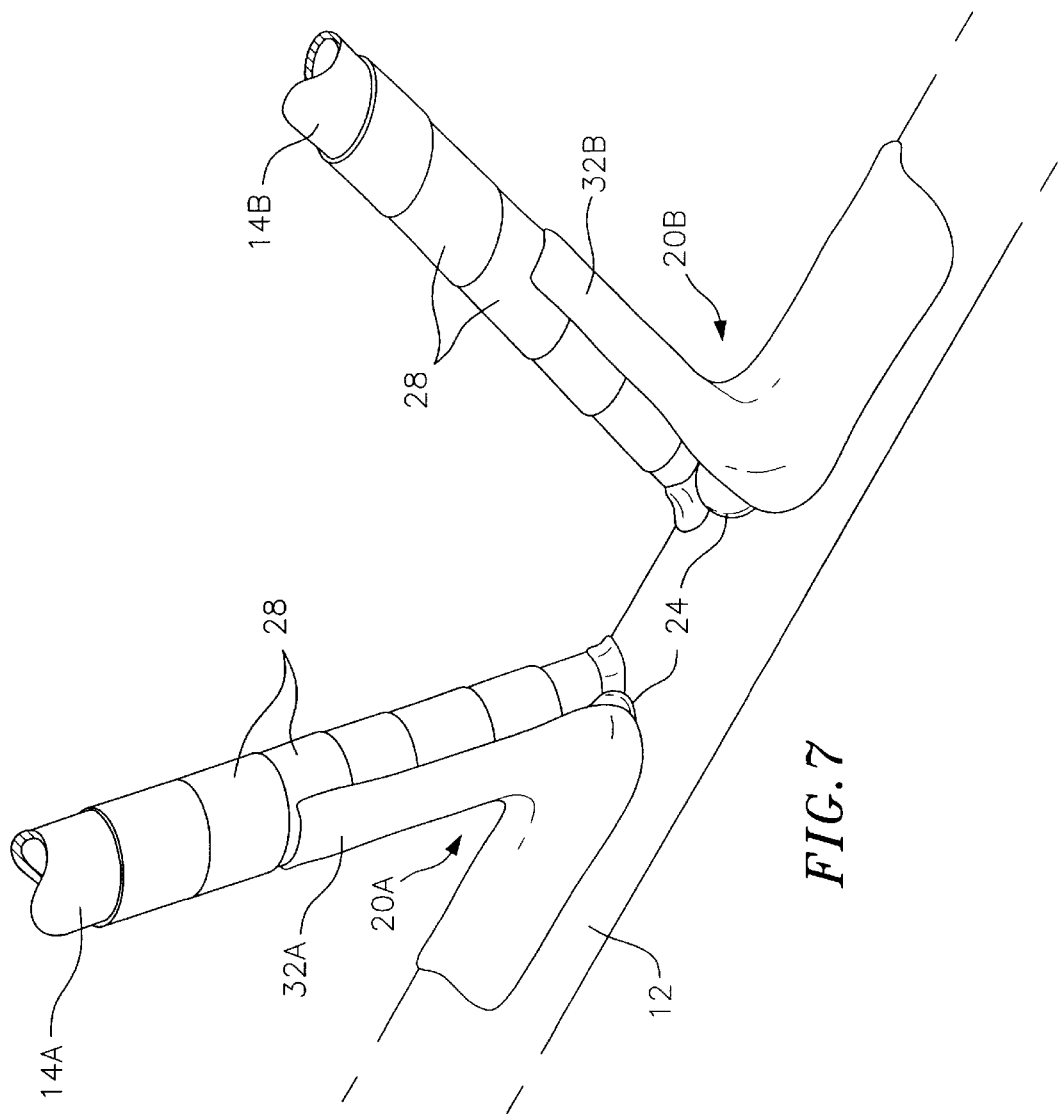
FIG. 7 is a perspective view showing the header tube and two cross-member tube arrangement of FIG. 5, with two resin impregnated strips of FIG. 6 being placed in the acute angled crotch regions where the cross-member tubes are joined to the header tube.

Turning to FIG. 5, the repair technician will open a package of 7.5 cm (3") wide, 260 gm/m$^2$ (11 oz./yd.$^2$) standard single ply roll of Aquawrap® Type G-03 fabric 28 which is pre-impregnated with water-activated resin and water-submerge the contents for about one minute or until it is sufficiently wetted. The Aquawrap® G-03 fabric 28 is a bidirectional material which has warp (lengthwise) fibers and fill (or weft—the fibers crosswise to the fill) fibers, and can be sourced from Bay Mills of Toronto, Canada. While 7.5 cm (3") wide, 260 gm/m$^2$ (11 oz./yd.$^2$) standard Aquawrap® is called out, other widths and weights can be utilized, depending upon the application and final strength desired. Any unused material not wetted can be saved in the metallic pouch for later steps. The user will tightly wrap the bonding areas of the small cross-member tube(s) 14A and 14B with a single layer of this material. Preferably starting from the epoxy putty line and preferably using a helical (bandage) wrapping method with no edge overlap, the user will thereby create as smooth and flat a first composite layer as possible, with the maximum bonding surface contact. FIG. 5 is a perspective view showing cross-member tubes 14A and 14B wrapped with resin impregnated segments applied thereto. FIG. 6 is a perspective view showing a section of Air Logistic Corporation's Bear™ Aquawrap® segment 32, which is a conformable, braided tubular fabric having a large number of diagonally opposed fiber strands 34 and 36, which permit the fibers therein to be able to independently bend, flex and contort. This conformable material can have a weight of about 380 gm/m$^2$ (16 oz./yd.$^2$) (per layer), but other weights will function. These conformable segments or strips are thus able to closely conform to contoured surfaces, such as two or more tubes joined at angles. While the use of a braided tubular fabric achieve good results, other types of weaves which permit the fabric to be flexed to fit irregular shapes can be used as well. The fabric is pre-impregnated with water activated resin. In use, the conformable segments 32 will be flattened against tubes 12, 14A and 14B. The user will open a package of 10 cm (4") wide segments of the conformable segments 32. The user will take out two pieces of the 10 cm (4") wide conformable segments 32A and 32B and water-submerge them for about one minute or until thoroughly wetted to activate the resin. Any pieces remaining inside the foil bag will be protected from moisture by closing the top of the foil bag. As shown in FIG. 7, these activated segments 32A and 32B are applied in both of the acute angles regions 20A and 20B of each cross-member tube 14A and 14B, in line with the centerline of the header tube 12. The user can "saddle in" segments 32A and 32B so that they lay down smoothly and preferably so that they fully cover a bit more than half of cross-member tube 14A and 14B and the epoxy putty in acute regions 20A and 20B.

Figure 8:
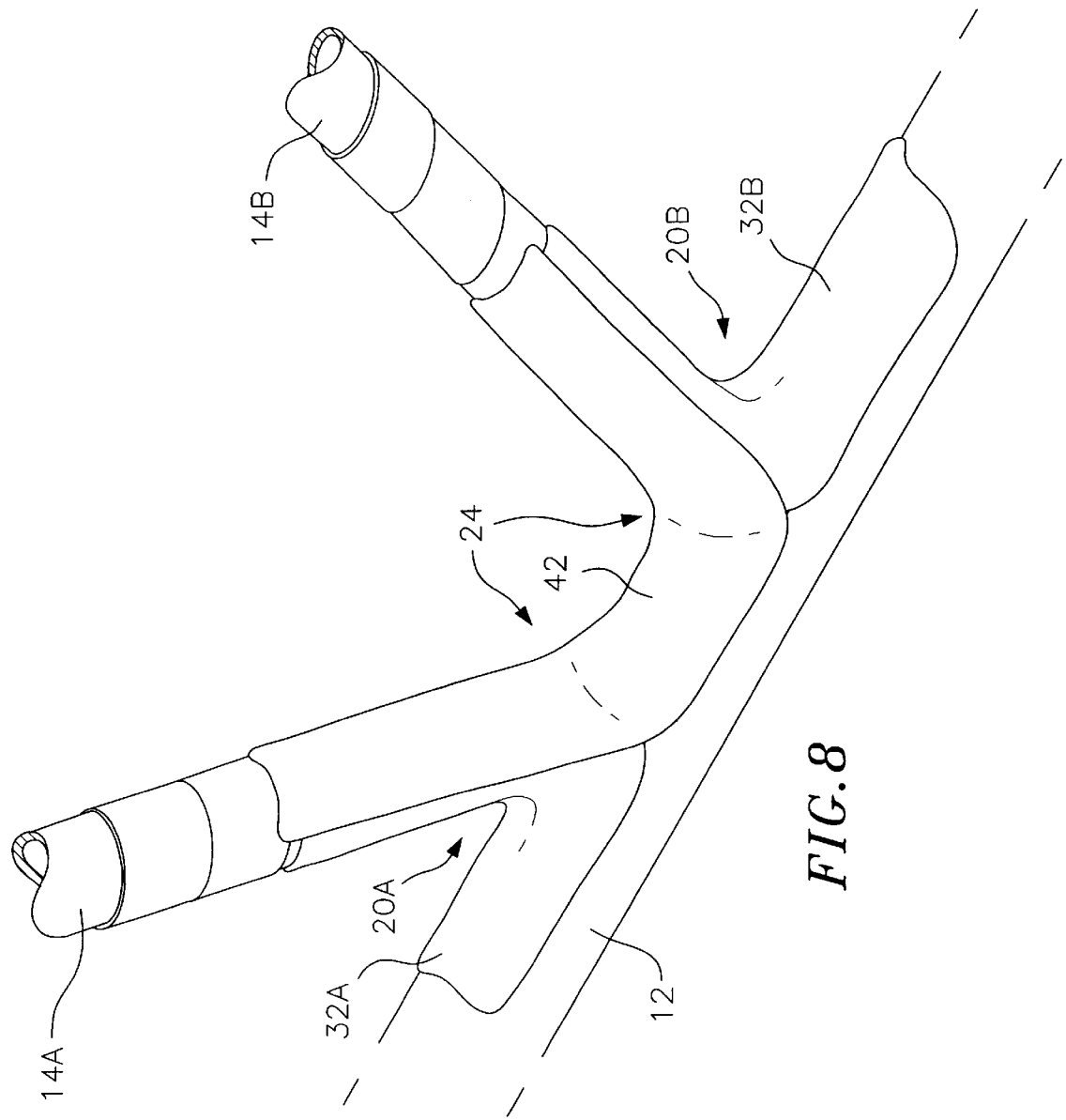
FIG. 8 is a perspective view showing the header tube and two cross-member tube arrangement of FIG. 7, but with the resin impregnated segments of FIG. 6 being placed in the obtuse angle saddle region where the cross-member tubes are joined to the header tube.

The user will next open a package of longer segments of 10 cm (4") wide conformable segments. One piece will be water-submerged for about one minute or until it is sufficiently wetted. Any remaining pieces are left inside the foil bag and the top is closed. As best shown in FIG. 8 the user will apply activated conformable segment 42 into obtuse angle regions 24 between the cross-member tubes 14A and 14B and header tube 12. The user will "saddle in" this conformable segment also, and overlap the previously applied segments 32 slightly. If necessary, the segments can be held in place with a band of the single ply Aquawrap® G-03 material or other material wrapped around the segments 32 and 24 or Backbone™ Aquawrap® layers (discussed below) to keep them positioned properly while the layup continues. The order of placing segments in the acute angled regions, then in the obtuse angled region, can be reversed.

Figure 9:
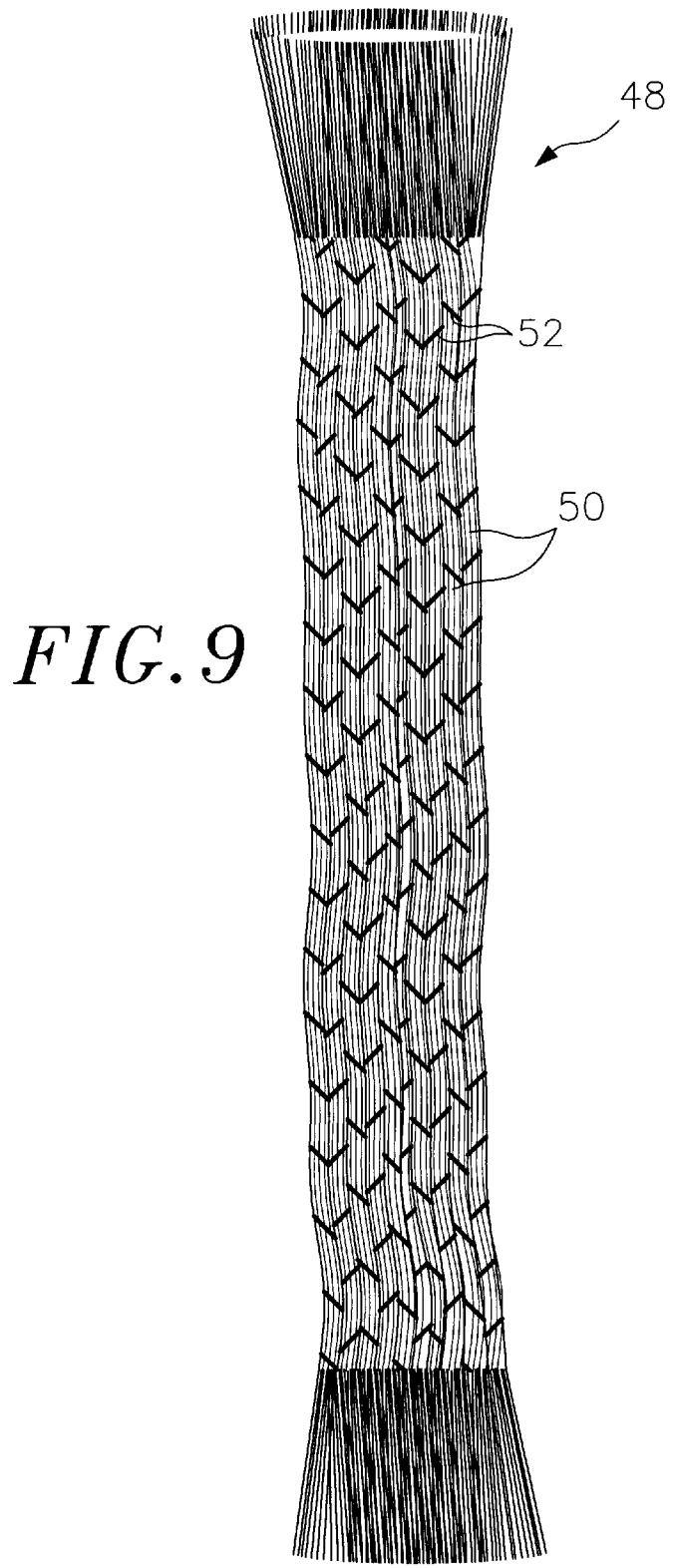
FIG. 9 is a perspective view of the tendon strips.

FIG. 9 is a perspective view showing a section of a Backbone™ Aquawrap® tendon segment 48, which has a number of relatively thick fiber bundles 50 held together with elastic cross-threads 52 to form a tubular structure which is a unidirectional fabric. Elastic cross-threads 52 hold thick fiber bundles 50 together but permit some small amount of longitudinal movement of thick fiber bundles 50 relative to each other as well as some degree of lateral separation of the thick fiber bundles 50. The fabric can have a weight of about 570 gm/m$^2$ (24 oz./yd.$^2$). The fabric is pre-impregnated with water-activated resin. In use, tendon segment 48 will be flattened. Tendon segments 48 can be narrower than the other segments (e.g. above 2.5 cm (1") wide). The Backbone™ Aquawrap® segments are water-submerged for about one minute or until sufficiently wetted to activate the resin.

Figure 10:
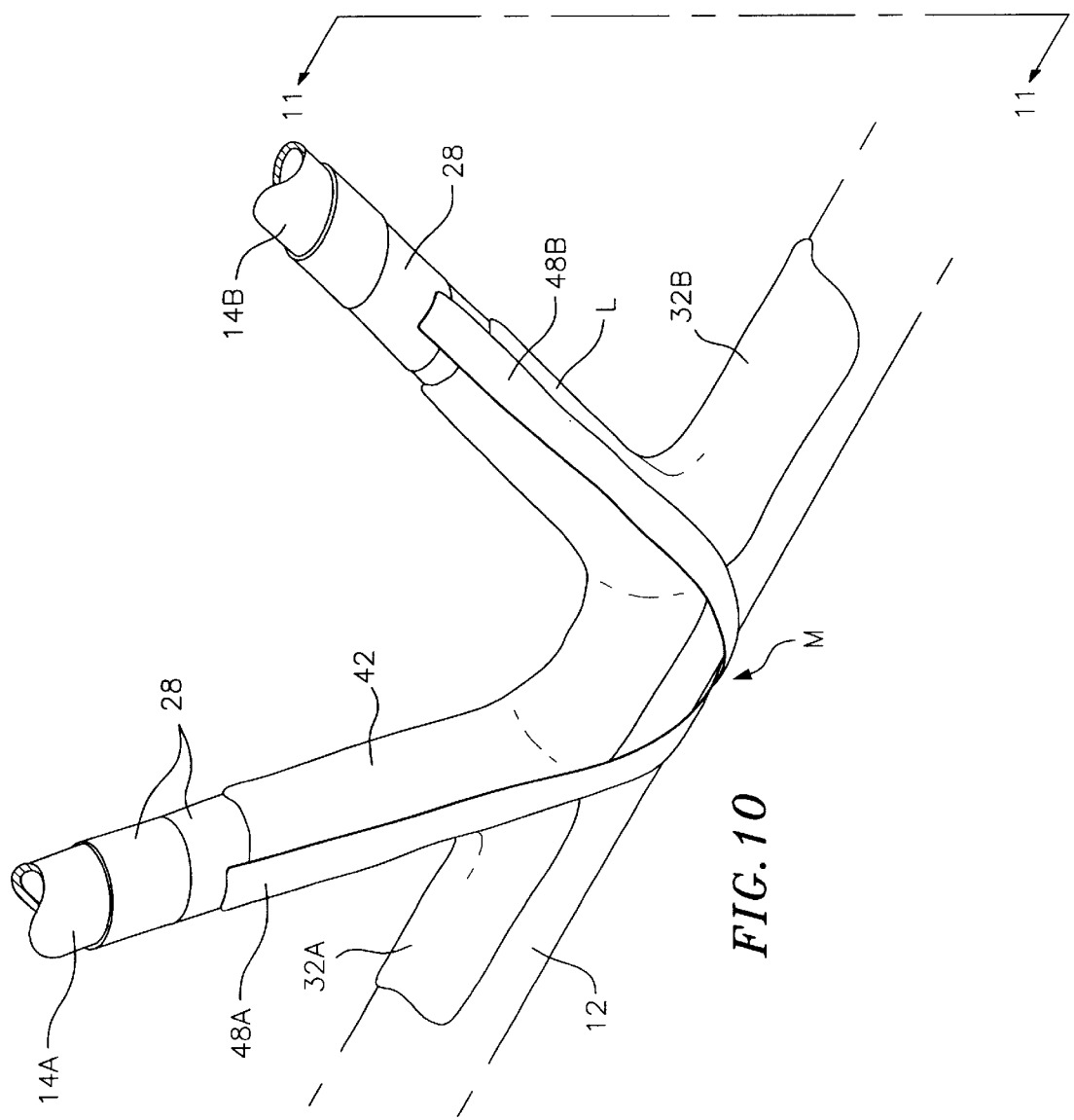
FIG. 10 is a perspective view showing the header tube and two cross-member tube arrangement of FIG. 8, with two resin impregnated tendon segments of FIG. 9 placed around the header tube and two cross-member tubes.
Figure 11:
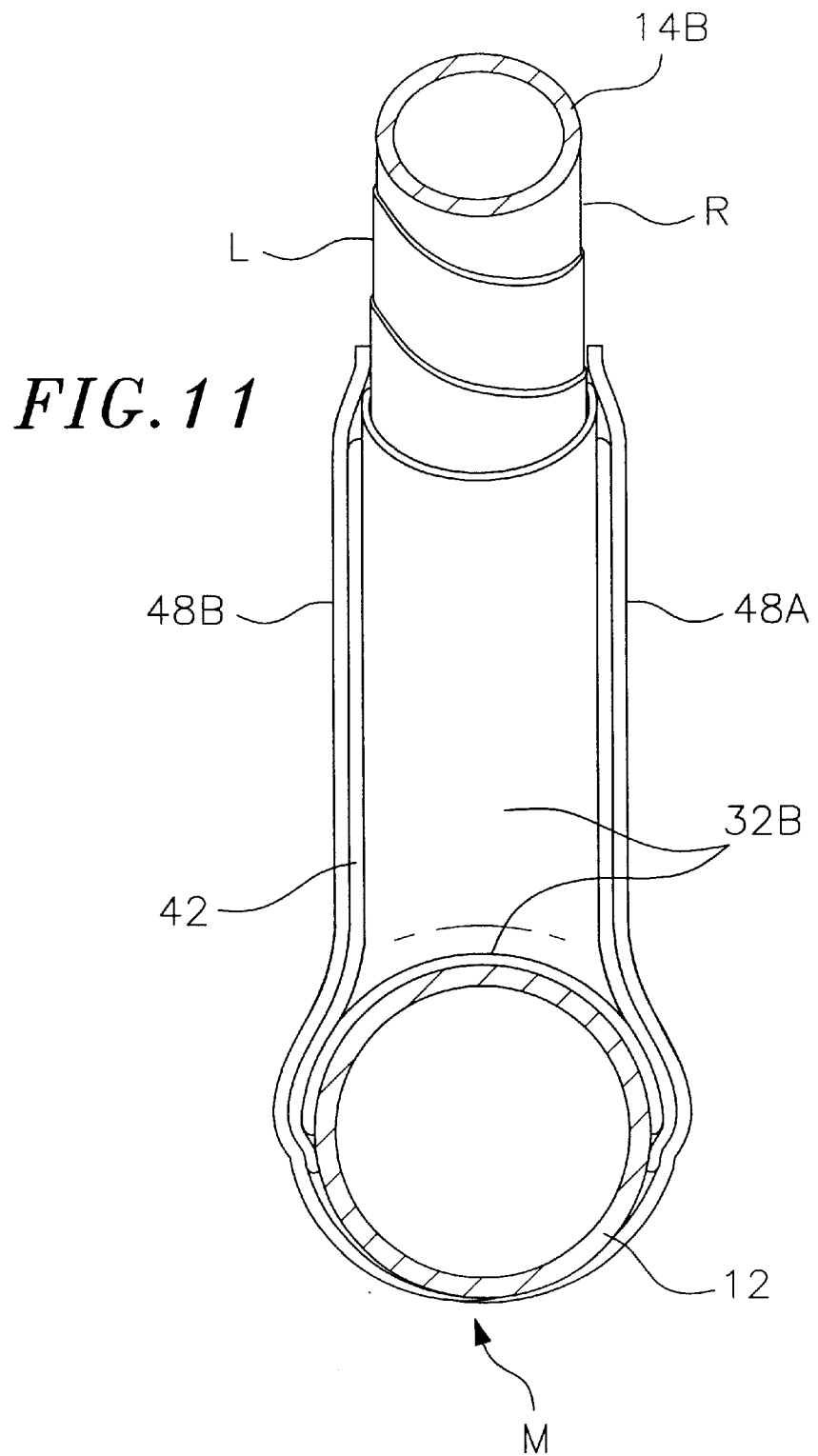
FIG. 11 is a cross-sectional view through lines 11—11 of FIG. 10.

Referring to FIGS. 10 and 11, starting at the end of the bonding area of tendon cross-section tube 14B, the user will lay on a tendon segment down a left face-side L of cross-member tube 14B, crossing under header tube 12 and continue up the right face-side R of cross-member tube 14A. For adjacent cross-member tubes, two tendon segments 48A and 48B are used, with one end laid up onto one face-side of one cross-member tube 14A and 14B, crossing around to about the header tube 12 backside midpoint M (opposite where the cross-member tubes join the header tube), then continuing up the other face-side of the opposite side of the adjacent cross-member tube 14A. This process is repeated with a second tendon segment 48B, starting and ending on the unoccupied faces of both cross-member tubes. Tendon segments 48A and 48B will form an "X" crossing on the backside M of the header tube 12. For repair sites that have a header tube and one cross-member tube, a single tendon segment can be used to wrap from side to side and under the header tube (in a generally U-orientation). The use of tendon segments act to tie together header and cross-member tube (s) and add greatly to the strength of the repair site.

Figure 12:
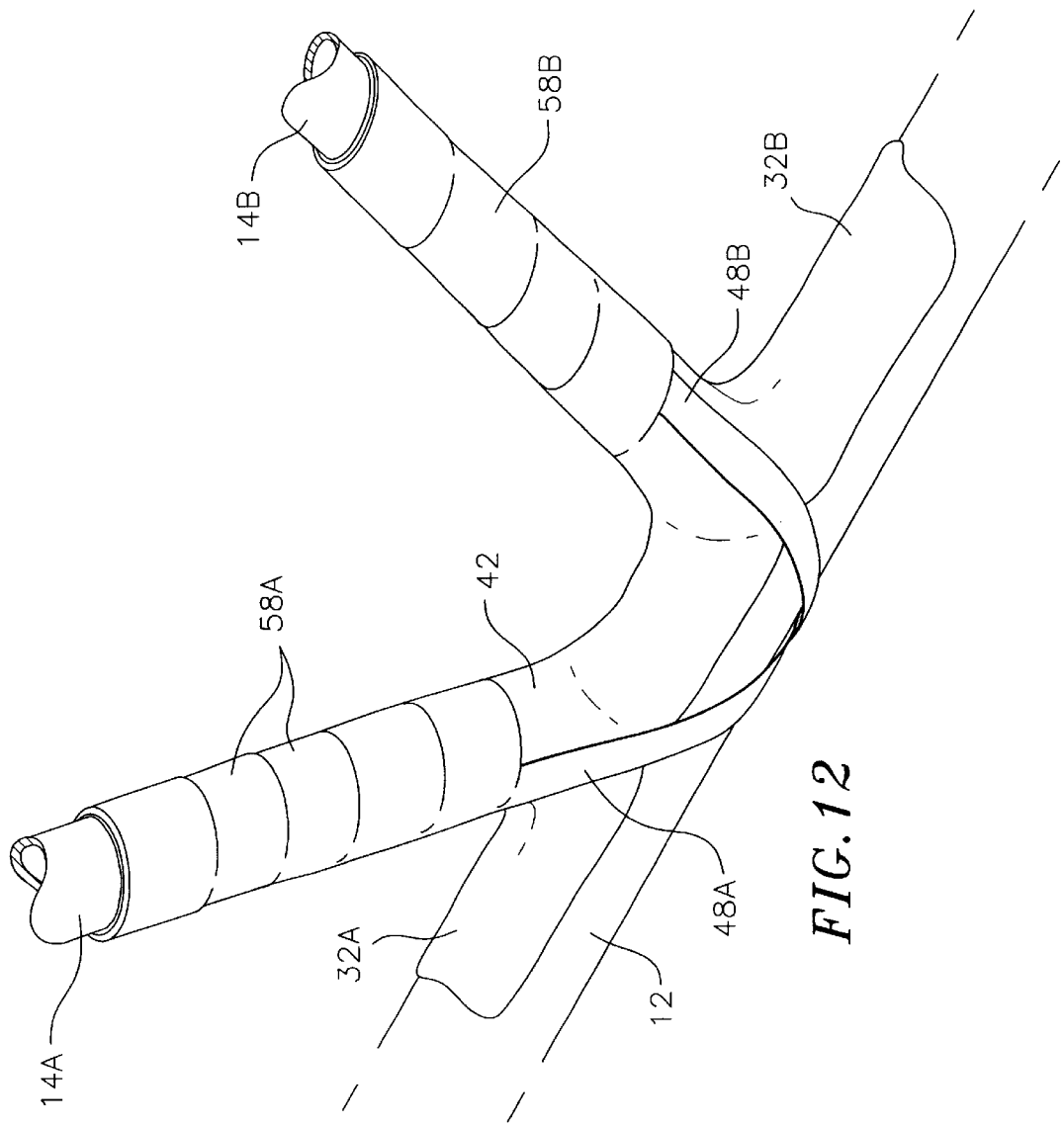
FIG. 12 is a perspective view showing the header tube and two cross-member tube arrangement of FIG. 10, with the two resin impregnated tendon segments being further helically wrapped by resin impregnated segments.

In a next step, the ends of the segments 48A and 48B are secured to the sides of cross-member tubes 14A and 14B with an additional wrap of woven segments 58 (the same type of material as segments 28), as best shown in FIG. 12.

Figure 13:
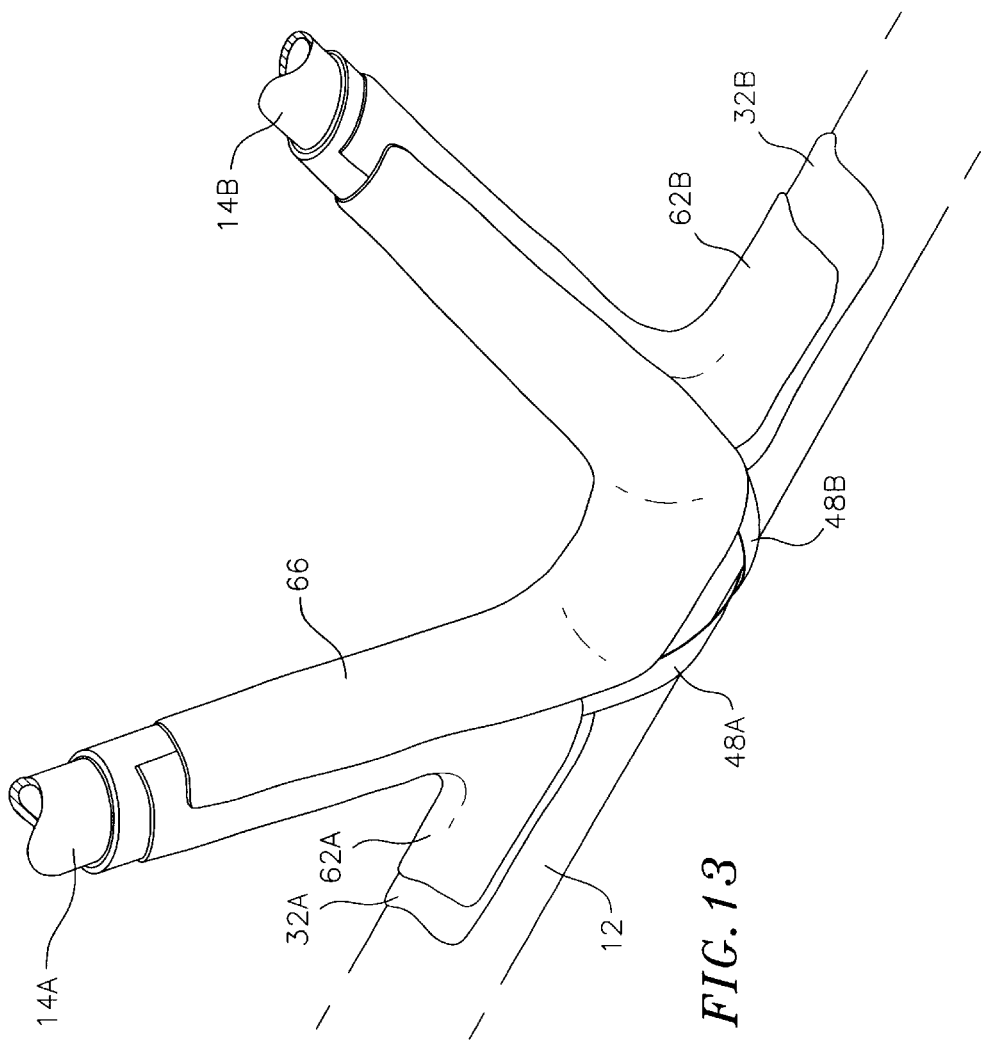
FIG. 13 is a perspective view showing the header tube and two cross-member tube arrangement of FIG. 12 with the resin impregnated segments of FIG. 6 being placed in the obtuse angled saddle regions and the acute angled crotch regions.

Next, the user will take two additional pieces of the conformable segments 62A and 62B and water-submerge them for about one minute or until sufficiently wetted. The activated conformable segments 62 are laid down over the top of the previously applied segments 32A and 32B, and are saddled in so that they cover portions of the tendon segments 48A and 48B. An additional longer conformable segment 66 is water activated and is applied over the previously applied segment 42 and covers part of the tendons 48A and 48B as well as parts of segments 62A and 62B. FIG. 13 is a perspective view showing this layup. Again, conformable segments 62A and 62B can be applied after conformable segment 66, if desired.

Figure 14:
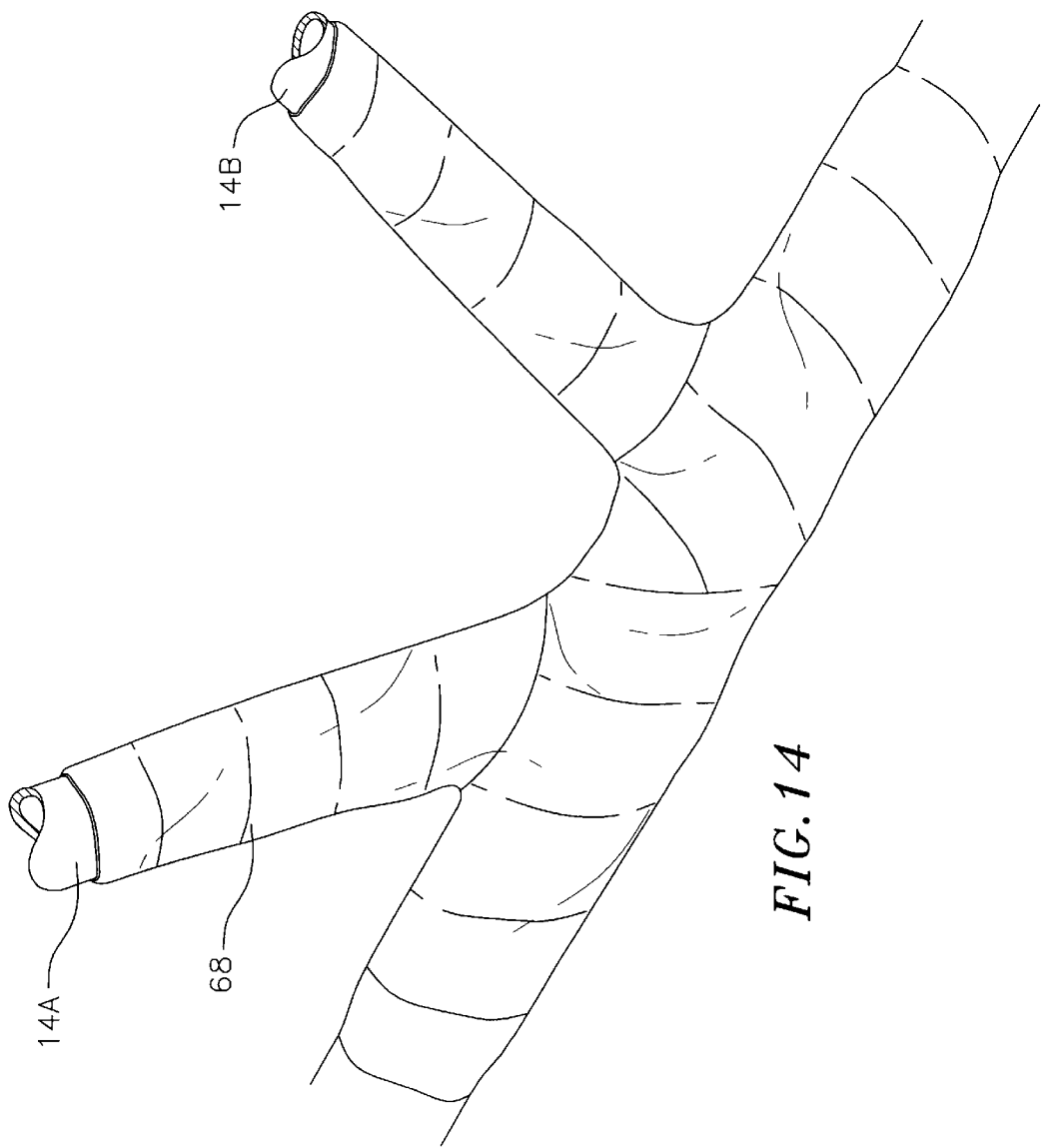
FIG. 14 is a perspective view showing the header tube and two cross-member tube arrangement of FIG. 13, but overwrapped with resin impregnated segments.

A last layer of resin impregnated G-03 tape 68 can be wrapped over the entire repair site. The user will water-activate an additional roll of the G-03 tape 68 (e.g. about 7.5 cm (3") wide, 260 gm/m² (11 oz./yd.) standard single ply strips). Starting at the joint areas, the user will completely wrap-encapsulate all of the composite layup with the single ply G-03. FIG. 14 shows the repair after being completely wrapped. The wrapping should be done as tightly as possible. This completes the composite layup steps of the exemplary method.

In order to ensure that the composite layup cures closely against the repair site, a compressive stretch-film 74 can be tightly wrapped around all of the composite layup site. For example, Stricture Banding™, provided by Air Logistics of Azusa, Calif., can be used on all Aquawrap® surfaces, and used by covering these areas with one or more Stricture Banding™ layers. The purpose of the Stricture Banding™ is to be elastically stretched and wrapped on, thereby tightly compressing the composite layup to the repair site to ensure good bonding and close contact therewith.

Figure 15:
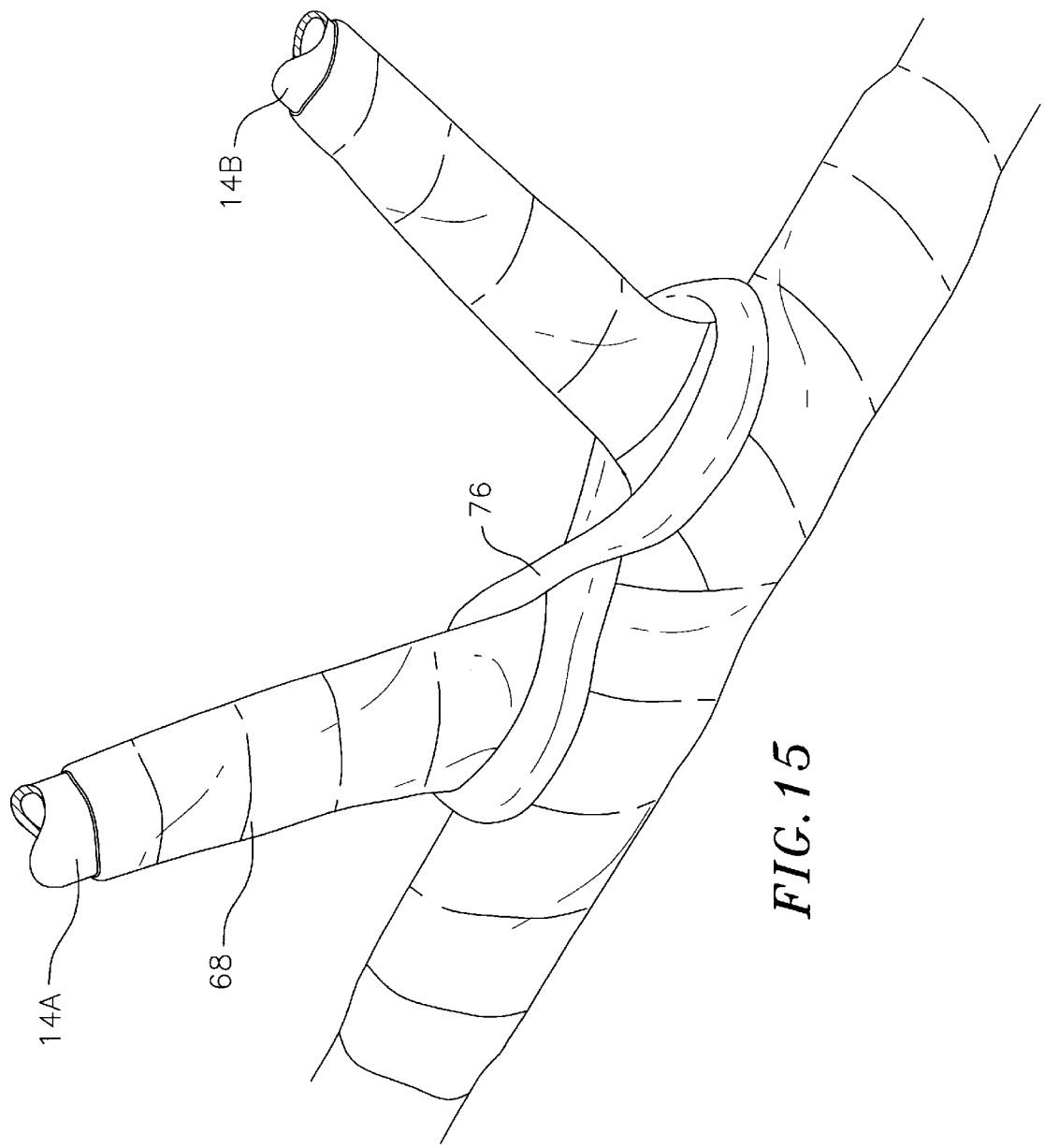
FIG. 15 is a perspective view showing the header tube and two cross-member tube arrangement of FIG. 14, with load transfer rods being wrapped around the vicinity of the overwrapped weld joints and secured there with Stricture Banding™ to retain the load transfer rods in place.

Lastly, in order to ensure close contact between the composite materials, the tubes and coving, firm but flexible rod-like material (load transfer rods) 76 can be applied around and over the weld joint areas of the repair sites on top of the first courses of Stricture Banding™, and can itself be secured and elastically loaded with Stricture Banding™ to retain the load transfer rods in place and to convey the elastic load down into the acute angles and spots where regular Stricture Banding™ wrapping will be less than adequate. The Stricture Banding™ can be ventilated at several locations by poking holes in it, for example by using the point of a sharp knife or by using a porcupine roller. These holes allow curing bubbles and any excess water to escape. The Stricture Banding™ could also be provided with ventilation holes or slits already provided to obviate any need for the step of making additional holes by poking. FIG. 15 is a perspective view showing the repair sites covered with Stricture Banding™ and load transfer rods installed in place.

Lastly, after a period of curing time the composite layup is checked for hardness. If it is at least hard enough to resist indentation by pushing with a human fingernail, and if there is no further evidence of curing-gas evolution, then the Stricture Banding™ and the load transfer rod is unwrapped and/or cut away (for example with emergency medical technician bandage-cutting safety shears) or with other tools to prevent nicks or cuts to the composite surfaces.

If desired, after the site is cured, the site can be painted with an appropriate high quality paint to match the color of the unrepaired structure. Alternately, the Aquawrap® strips or other pre-preg composite repair strips can come already pre-colored (e.g. in aluminum color) to match the repaired structure.

Figure 16:
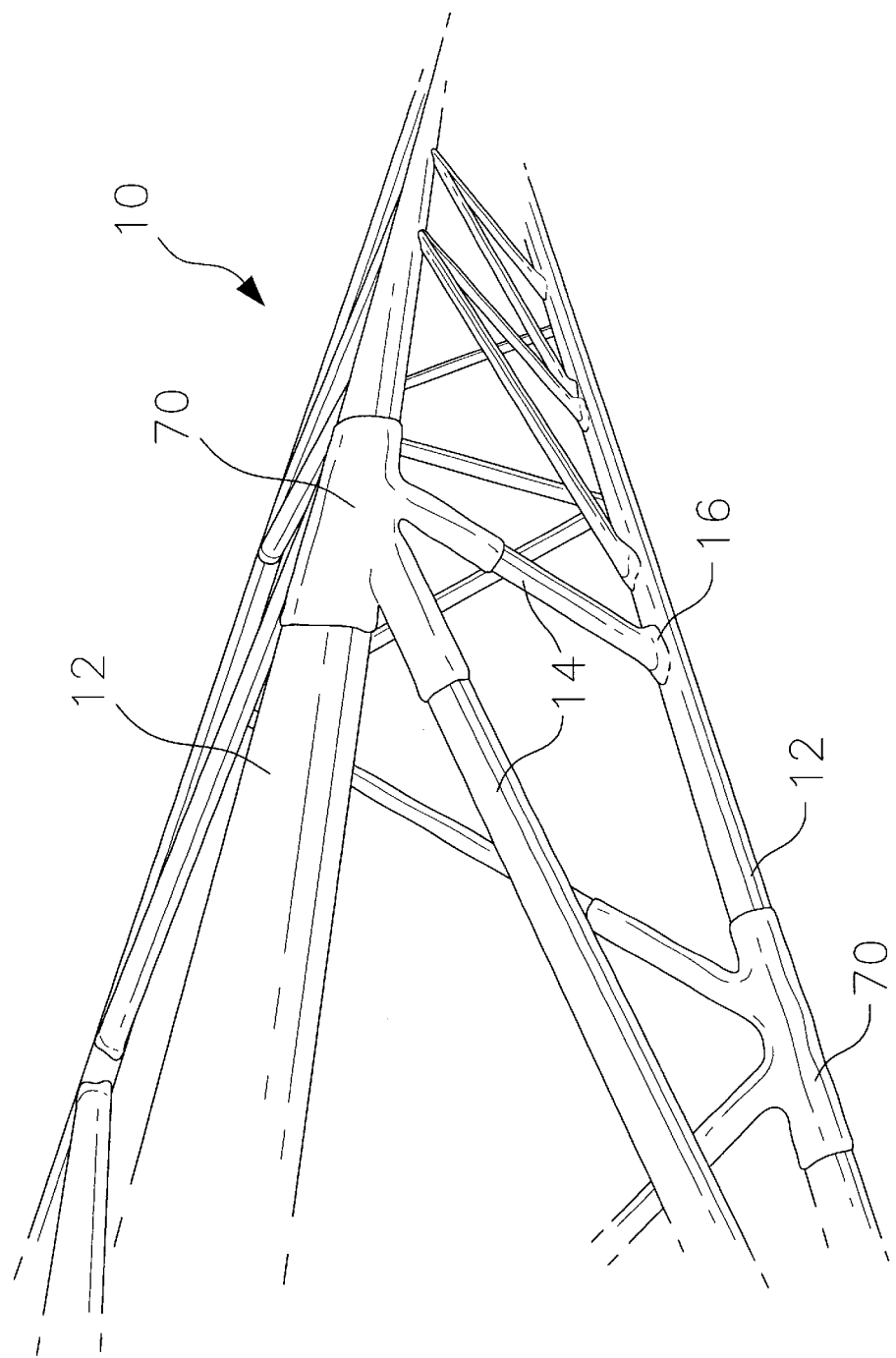
FIG. 16 is a perspective view of a rear side of a tubular sign support structure of FIG. 1, but with the cracked welds repaired.

FIG. 16 is a perspective view of a rear side of a tubular sign support structure 10 of FIG. 1, but with the composite repair area 70 repaired according to the method.

In a further exemplary embodiment of the invention, a method of making a repair to a repair site of a structure made from at least a first tube and a second tube which are joined together with welds is disclosed. The first tube and second tube at the repair site are cleaned and prepared for bonding with composite repair materials. Thereafter, composite repair materials are applied to the repair site. The composite repair materials include at least one elongate, composite tendon strip which is placed on the first tube and the second tube such that the composite tendon strip bridges the first tube and a second tube. The tendon strip is then overwrapped with additional composite strips.

The invention also provides a metal structure having a reinforced composite material repair site 70, as shown in FIG. 16. The metal structure has an elongate metal header tube 12 and at least one elongate metal cross-member tube 14 welded with welds 16 to the header tubes to join the header tubes together in a spaced apart orientation, as shown in FIG. 16. A composite material repair site 70 is formed in the vicinity of an area where welds between the at least one cross-member tube 14 and the header tube 12 are insufficiently strong, the composite material repair comprising resin impregnated composite segments 28, 32, 42, 48, 58, 62, 66 and 74 applied to the repair site (as shown in FIGS. 5, 7, 8, 10, 12, 13 and 15), including at least one elongate, resin impregnated composite tendon segment 48. In the structure shown in FIG. 10, two cross-member tubes 14A and 14B are welded to the header tube 12. The first end of the tendon segment 48A is placed on one side L of the first cross-member tube 14A and is wrapped around the header tube 12 with the second end wrapped back around an opposite side R of the second cross-member tube 14B such that the composite tendon strip bridges both cross-member tubes and the header (See FIG. 11). A second tendon segment 48B is placed on the two cross-member tubes and the header in an opposite manner. In cases where the repair site is for reinforcing the joint of a single cross-member tube to a header, a tendon strip can be wrapped around from side L under the header tube and back up around side R of the single cross-member tube, as shown in FIG. 13. The tendon segments 48A and 48B are covered with conformable segments 62A and 62B and 66, and the repair site is helically overwrapped with segments 68.

Figure 17:
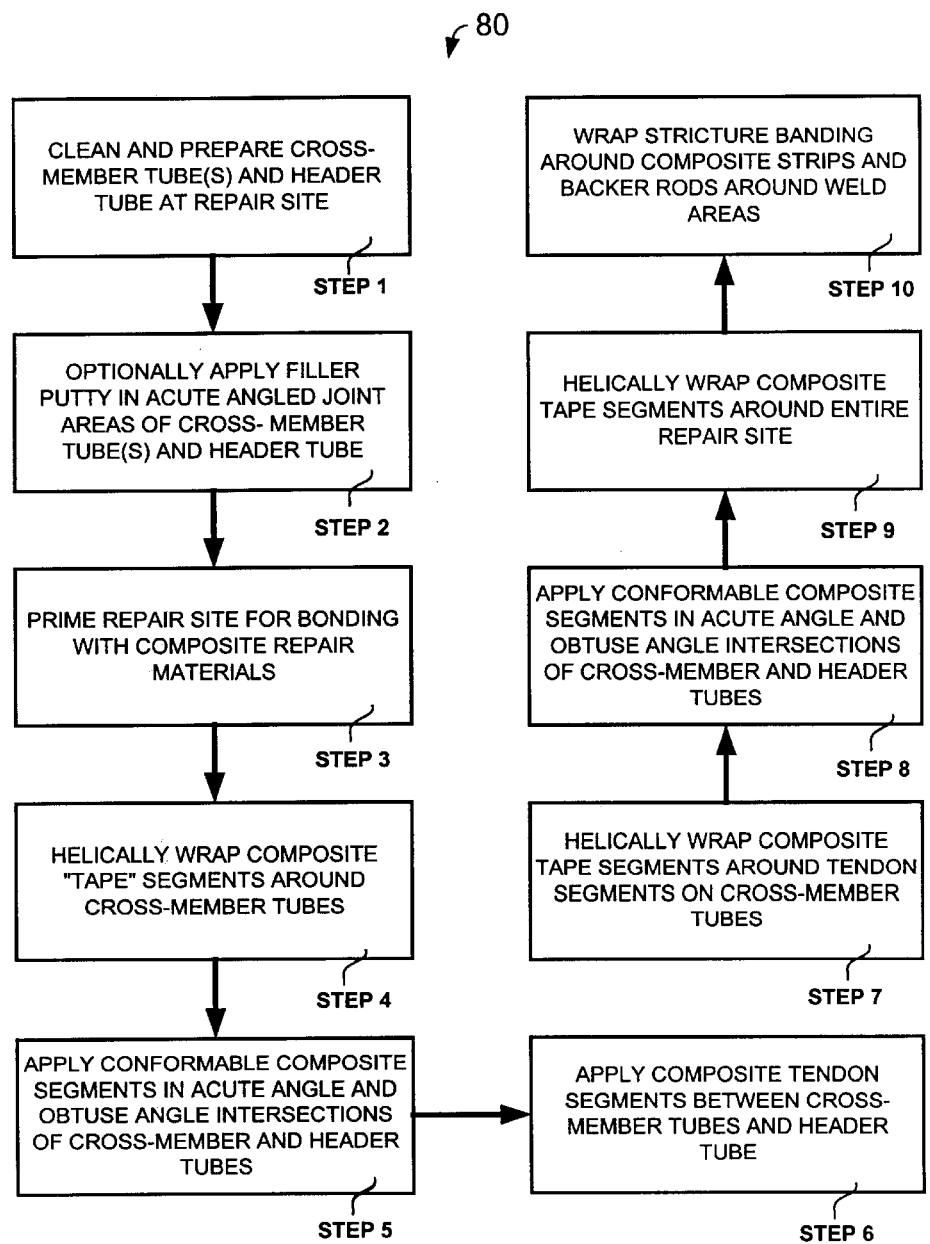
FIG. 17 is a flowchart showing steps of one exemplary embodiment of the invention.

FIG. 17 is a flow chart 80 outlining the basic steps of repair in the method of the invention. In step 1, the user will clean and prepare the cross-member tube(s) and header tube at the repair site. In step 2, the user can optionally apply filler putty to at least the acute angled joint areas of cross-member tubes and header tube. In step 3, the user will prime the repair site for bonding with composite materials. In step 4, the user will helically wrap fine-weave, single ply composite "tape" strip around cross-member tubes. In step 5, the user will apply conformable composite strips in the acute angle and obtuse angle intersections of the cross-member tubes and the header tube. In step 6, the user will apply Backbone™ composite tendon strips between the cross-member tubes and the header tube. In step 7, the user will helically wrap more "tape" composite strips around the tendon strips on the cross-member tubes. In step 8, the user will apply more conformable composite strips in the acute angle intersections and the obtuse angle intersections of the cross-member tubes and header tube. In step 9, the user will helically wrap more "tape" composite strips around the entire repair site. In step 10, the user will wrap Stricture Banding™ around the composite layup; add load transfer rods and apply the final Stricture Banding™ around the weld areas and leave it in place until the composite repair material is cured.

Figure 18:
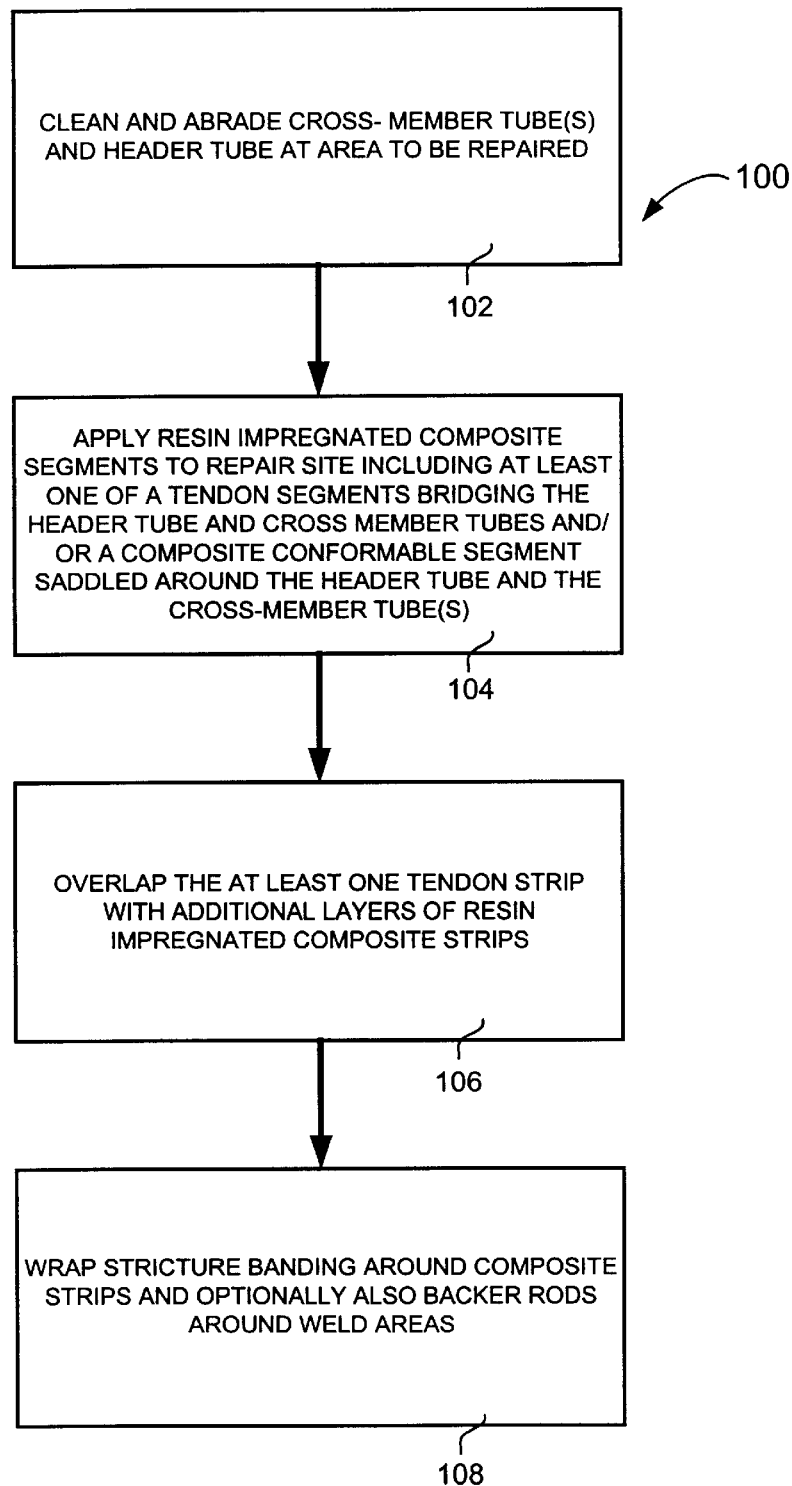
FIG. 18 is a flowchart showing steps of another exemplary embodiment of the invention.

Turning to FIG. 18, there is shown a flow chart 100 showing the steps of another exemplary embodiment of the method of the invention. In a first step 102, the user will clean and abrade the cross-member tubes and header tube of the repair site. In a second step 104, the user will apply resin impregnated strips to the tubes in the vicinity of the repair site, including at least one of an elongate tendon strip which will generally longitudinally lay on the header tube and cross-member tubes and/or conformable segments which bridge the header tube and cross-member tube. In a third step 106, the user will overwrap the at least one elongate tendon strip with composite material. In a fourth step 110, the user can wrap load transfer around the entire repair site, and optionally use backer rods around the weld areas to help ensure close contact between the composite repair material and the tubes during curing.

As noted above, the various materials used for the method can be conveniently provided in fully self-contained kits, with field-oriented packaging and instructions. Using the kit concept and instruction manual, repair technicians can be trained to do these repairs very quickly, and in as little as one day. Once trained and accustomed to the repair procedures, repairs are easily completed in the field in less than two hours per double joint.

Not only are the repairs fast and convenient, they are strong as well. For example, testing has shown that for undamaged welds that would normally fail at 25,000 lbs., the load strength for un-welded but composite repaired joints repaired according to the invention will support a 30,000-lb. load.

A variety of further modifications and improvements to the invention described herein will be apparent to those skilled in the art. Accordingly, no limitation on the invention is intended by way of the foregoing description and accompanying drawings, except as set forth in the appended claims. Also, as used herein, unless otherwise specified, plural terms subsume the singular and singular terms subsume the plural.

What is claimed is:

1. A method for making a repair to a repair site of a structure made from at least a first tube and a second tube which are mechanically joined together, the method comprising the steps of:

cleaning and preparing the at least first tube and second tube tubes at the repair site for bonding with composite repair materials; and applying fiber-reinforced polymer (composite) repair materials to the repair site, the composite repair materials including at least one of an elongate, composite tendon segment which is placed on and bridges the at least first tube and second tube and a conformable segment which are saddled between the at least first and second tubes, and overwrapping the at least one of an elongate, composite tendon segment and the conformable segment placed on the at least first tube and second tube with additional composite segments.

2. The method of claim 1, wherein the step of cleaning and preparing the at least first tube and second tube at the repair site comprises chemical washing of the repair site.

3. The method of claim 2, wherein the chemical washing comprising alkali chemical washes and acidic chemical washes followed by rinsing and drying of the repair site.

4. The method of claim 2, wherein the step of cleaning and preparing the at least first tube and second tube at the repair site further comprises mechanically roughening the surface of the at least first tube and second tube at the repair site.

5. The method of claim 1, wherein the at least first tube and second tube are mechanically joined together by welds, and further including a step of drilling a pilot hole in front of any cracks in welds between the at least first tube and second tube at the repair site.

6. The method of claim 5, further including a step of applying a coving material over portions of welds between the at least first tube and second tube at the repair site prior to the step of applying composite segments to the repair site.

7. The method of claim 6, wherein the coving material is applied to acute angle joint areas between the first and second tubes.

8. The method of claim 6, wherein the coving material is moldable epoxy putty.

9. The method of claim 1, further including a step of applying a primer to the repair site prior to the step of applying composite segments to the repair site.

10. The method of claim 1, wherein the step of applying composite segments to the repair site comprises saddling conformable composite segments between the first and second tubes and then applying the composite tendon strips to bridge between the first and second tubes.

11. The method of claim 1, wherein the at least first tube and second tube are joined together to define an acute angle intersection side and an obtuse angle intersection side, and the step of applying composite segments to the repair site comprises saddling a conformable composite segment in the acute angle intersection side to bridge the at least first tube and second tube and saddling a conformable composite strip in the obtuse angle intersection side to bridge the at least first tube and second tube.

12. The method of claim 1, wherein the composite repair materials are supplied pre-impregnated with resin.

13. The method of claim 1, wherein the composite repair materials are supplied pre-impregnated with water activated resin, and are moistened with water for activation prior to application to the repair site.

14. The method of claim 1, including a further step of wrapping a constricting and consolidating banding around the repair site to compress the composite repair materials against the at least first tube and second tube at the repair site during curing of the composite repair materials.

15. The method of claim 14, further including a step of wrapping a compressible load transferring rod over the banding in the vicinity of interface regions where the at least first tube and second tube are joined together.

16. The method of claim 1, wherein the structure further comprises a third tube welded to the first tube adjacent to the second tube, and the composite tendon strip is placed on a first side of the second tube, crosses under the first tube, and wraps up around on a second side of the third tube to bridge together the first, second and third tubes.

17. The method of claim 16, further comprising placing a second tendon segment on a second side of the second tube generally opposite the first side, crossing it under the first tube and crossing over the first tendon segment, and wrapping it up around on a first side of the third tube generally opposite the second side.

18. A method for making a repair to a repair site of a structure made from at least a first tube and a second tube which are joined together with welds, the repair site comprising areas where the first and second tubes are welded together and the general vicinity of the welded areas, the method comprising the steps of:

cleaning and abrading the at least first tube and second tube at the repair site;

priming the repair site; and applying resin impregnated fiber-reinforced composite segments to the at least first tube and second tube in the vicinity of the repair site, including at least one resin impregnated elongate tendon composite segment which is applied to bridge the first tube and the second tube, and conformable segments which are saddled and bridge between the at least first and second tubes, and a composite segment which is wrapped around the elongate tendon composite segments and the conformable segments applied to the at least first tube and second tube.

19. The method of claim 18, further including a step of drilling a stress-relieving pilot hole in front of any cracks in welds between the at least first tube and second tube at the repair site prior to applying the coving material.

20. The method of claim 18, further including a step of applying a primer to the repair site prior to applying the resin impregnated composite segments to the repair site.

21. The method of claim 18, wherein the step of applying composite strips to the repair site comprises helically wrapping resin impregnated composite segments around the first tubes, saddling the conformable composite strips between the first and second tubes, applying the at least one resin impregnated elongate tendon composite segment, saddling additional conformable resin impregnated composite segments between the first and second tubes over the at least one resin impregnated elongate tendon composite strip, and helically wrapping the repair site with an addition resin impregnated composite segment.

22. The method of claim 18, further including a step of wrapping a stretch film banding around the entire repair site to press the composite repair material against the at least first tube and second tube at the repair site during curing of the composite repair material.

23. The method of claim 22, further including a step of wrapping a load transferring rod over the banding in vicinity of where the at least first tube and second tube are welded together, and wrapping banding around the load transferring rod.

24. A metal structure reinforced with a composite material repair site, comprising:

a metal structure having a plurality of elongate metal header tubes and a plurality of elongate metal cross-member tubes welded with welds to the header tubes to join the header tubes together in a spaced apart orientation;

a composite material repair site in the vicinity of an area where welds between at least one cross-member tube and one of the header tubes is insufficiently strong, the composite material repair site comprising resin impregnated composite segments applied to the repair site, including at least one of an elongate, resin impregnated composite tendon segment with first and second ends, wherein the first end of the composite tendon strip is placed at the at least one cross-member tube and is wrapped around the header tube to bridge the first cross-member tube and the header tube, and a conformable segment which is saddled between the at least one header tube and at least one cross-member tube.

25. The metal structure reinforced with a composite material repair site of claim 24, further comprising coving material placed around portions of the weld areas of the repair site underneath the composite repair material.

26. The metal structure reinforced with a composite material repair site of claim 24, wherein the composite material repair site further comprises conformable composite strips saddled between the header tube and the cross-member tube.

27. The metal structure reinforced with a composite material repair site of claim 24, wherein the metal structure further comprises a second elongate cross-member tube welded to the same header tube, and wherein the at least one elongate, resin impregnated composite tendon strip placed on one side of the at least first cross-member tube, is wrapped around the header tube and is wrapped back around an opposite side of the second elongate cross-member tube such that the composite tendon strip bridges the first cross-member tube, the header tube, and the second cross-member tube.

* * * * *